United States Patent [19]

McCall

[11] 4,378,553
[45] Mar. 29, 1983

[54] DATA INPUT SYSTEM USING A SPLIT KEYBOARD

[76] Inventor: William C. McCall, 1231 S. Sixth, Arcadia, Calif. 91006

[21] Appl. No.: 243,294

[22] Filed: Mar. 13, 1981

[51] Int. Cl.$^3$ .......................... G06F 3/04; G08C 9/00
[52] U.S. Cl. .................................. 340/365 R; 400/82
[58] Field of Search ........................ 340/365 R, 365 S; 178/17 C, 30; 400/82, 87, 472, 473; 235/145 R, 145 A, 146

[56] References Cited

U.S. PATENT DOCUMENTS

| | | | |
|---|---|---|---|
| 2,196,987 | 4/1940 | Gaston | 400/82 |
| 3,305,062 | 2/1967 | Kittredge | 400/82 |
| 4,064,560 | 12/1977 | Baxter | 340/365 R |

FOREIGN PATENT DOCUMENTS 2319258 10/1974 Fed. Rep. of Germany ........ 400/82

OTHER PUBLICATIONS

"Digital X Typewriter Keyboard", Conway, *IBM Tech. Discl. Bulletin,* vol. 18, No. 12, May 1976, pp. 4187–4190.
"Interactive Teaching Aid for Typewriters", Cook, *IBM Tech. Discl. Bulletin,* vol. 22, No. 8A, Jan. 1980, p. 3285.

*Primary Examiner*—Thomas A. Robinson
*Attorney, Agent, or Firm*—Nilsson, Robbins, Dalgarn, Berliner, Carson & Wurst

[57] ABSTRACT

An electromechanical interactive terminal system is disclosed, utilizing a split keyboard to accommodate convenient use, even by disabled or infirm persons. The elements of a conventional typewriter (or console) keyboard are provided in two separate and distinct keyboard units, one of which includes the keys normally activated by the right hand while the other has the keys conventionally assigned for use by the left hand. Control and coding keys are similarly assigned. The two separate keyboard units can be used in various positions as by being affixed to a support member so as to be held in spaced-apart relationship, contiguous to the hands of an operator with his arms apart and supported at rest. The keyboard units each incorporate electrical apparatus for providing electrical signals representative of data symbols associated with the keys. Additionally, certain keys are coded to provide control signals used in association with display means, a data processor, and a printer. The data processor may include computer memory capabilities as in the form of a floppy disc and is operated to process data as well as driving the display means and the printer.

11 Claims, 2 Drawing Figures

DATA INPUT SYSTEM USING A SPLIT KEYBOARD

BACKGROUND AND SUMMARY OF THE INVENTION

A perpetual need exists for apparatus to improve the capability of infirm or disabled persons. A very large group of such people are not physically capable of operating a typewriter in a traditional configuration. Many such people either know how to typewrite, or could learn the operation. Consequently, a considerable need exists for a system, usable by an individual to formulate and process data while the individual's arms are in any of several spaced-apart support positions. Additionally, many people who are not infirm or disabled could be effectively accommodated by a keyboard structure with position flexibility.

A wide variety of data processing machines have been developed which effectively interface with an individual through a display screen and a conventional typewriter keyboard. Such terminal equipment has come into widespread use for the production of accurate printed copy as well as to process data, play games, and even interface with computer graphics systems. Consequently, through the device of keys or pushbuttons in the format of a conventional typewriter keyboard, an operator can effectively formulate and control data to accomplish a variety of desirable functions.

In general, the present invention includes a pair of keyboard units each of which incorporates the keys associated for activation by one hand of an operator. The units are connected in a data processing system and incorporate electromechanical apparatus for formulating signals representative of data. Furthermore, the keyboard units provide control functions to activate and control elements of the processing system. The keyboard units may be variously placed, for example, supported at spaced-apart locations on a stand adapted to be affixed to separate supports for the operator's arms or other auxiliary apparatus. With his arms variously supported, the operator actuates the keyboard units to formulate data and control signals, the functions of which may be exhibited to the operator on a display panel and subsequently otherwise processed or developed in the form of printed pages. Using such a system, a disabled operator can be accommodated so that movements of small range, limited to his fingers and eyes, can produce impeccable copy, for example.

BRIEF DESCRIPTION OF THE DRAWINGS

In the drawings, which constitute a part of this specification an exemplary embodiment demonstrating the various objectives and features hereof is set forth as follows.

DESCRIPTION OF THE ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment. Consequently, the specifice structural and functional details disclosed herein are merely representative, yet in that regard they are deemed to provide the best embodiment for purposes of disclosure and to provide a basis for the claims herein which are advanced to define the scope of the present invention.

Figure 1:
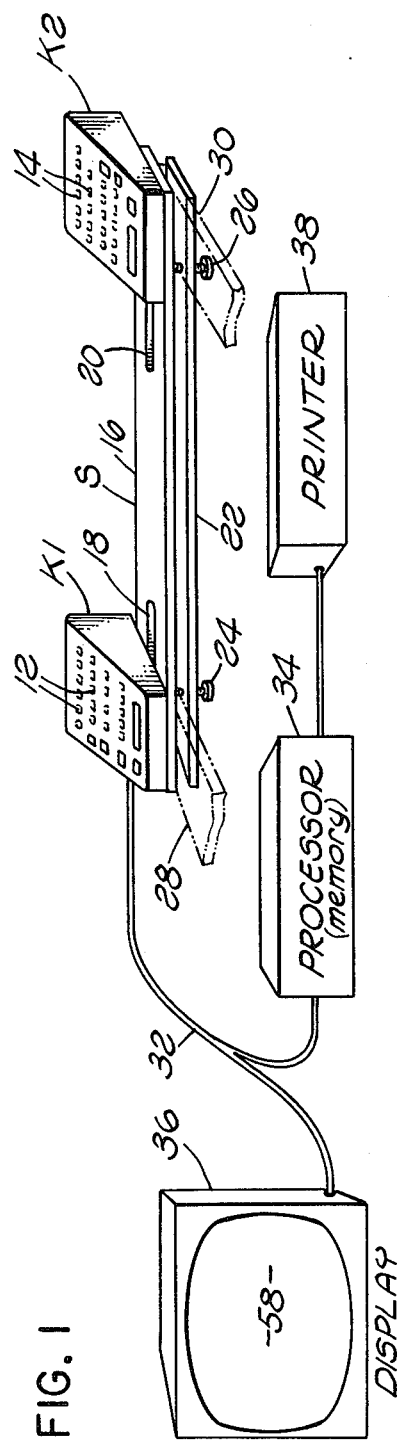
FIG. 1 is a perspective view of a system constructed in accordance with the present invention.

Referring initially to FIG. 1, keyboard units K1 and K2 are shown held in spaced-apart relationship on a stand S. As mounted, the keyboard units are positioned for use by an operator whose arms may be fully supported and who even may be in a supine position. As will be disclosed in greater detail, the keyboard units are operatively connected to elements of a data-processing system to accomplish various functions under their command. Accordingly, any person, even a disabled or handicapped individual, can accomplish a wide variety of useful tasks or engage in various activities with very limited movements that are restricted to the hands.

Considering the system of FIG. 1 in somewhat greater detail, the keyboard units K1 and K2 are essentially input pads, each carrying a partial set of standard alpha-numeric keys for activation by one hand of an operator. As illustrated, the keyboard K1 includes keys 12 which are associated with a standard typewriter keyboard and which are conventionally assigned for operation by the left hand. Complementary to the keys 12, a set of keys 14 in the keyboard unit K2 are identified with a standard typewriter keyboard and specifically include those keys for activation by the right hand. The keyboard units K1 and K2 along with their data and control functions, are treated in considerable detail below.

The stand S holding the keyboard units K1 and K2 allows the units to be variously adjusted in spaced-apart relationship. Specifically, a channel bar 16 defines an aligned pair of slots 18 and 20 each of which matingly receives a bracket (not shown). Such brackets are individually affixed respectively to the keyboard units K1 and K2. Accordingly, the keyboard units K1 and K2 may be set apart at various distances, depending on the positional demands of an operator.

The channel bar 16 is affixed to a clamping bar 22 by threaded locking bolts 24 and 26. As illustrated, a pair of armrest structures 28 and 30 (illustrated in fragment) are clamped between the channel bar 16 and the clamping bar 22. Consequently, the apparatus of the stand S and the keyboard units K1 and K2 is supported illustratively with the keyboard units K1 and K2 conveniently positioned adjacent to the armrest structures 28 and 30.

The channel bar 16 accommodates an electrical cable 32 which couples the keyboard units K1 and K2 to other elements of the system. Specifically, the cable 32 interconnects the keyboard units K1 and K2 with a processor 34 which is in turn connected to a display apparatus 36 and a printer 38. The processor 34 incorporates a memory capability which might take the form of apparatus for the utilization of a floppy disc as well known in the art. The processor further incorporates control means actuated by coded inputs from the keyboard units K1 and K2 to accomplish a variety of selected control functions.

The display apparatus 36 may incorporate a cathode ray tube as well known in the prior art. Also as well known in the prior art, the printer 38 may utilize a printing disc (not shown) or other such type structures for accomplishing sequential letter printing. It is to be noted that the electronic components of the system of FIG. 1 may be in accordance with existing and well known word processing machines, one form of which is manufactured under the trademark "VYDEC" by an affiliate of EXXON Enterprises, Inc.

Figure 2:
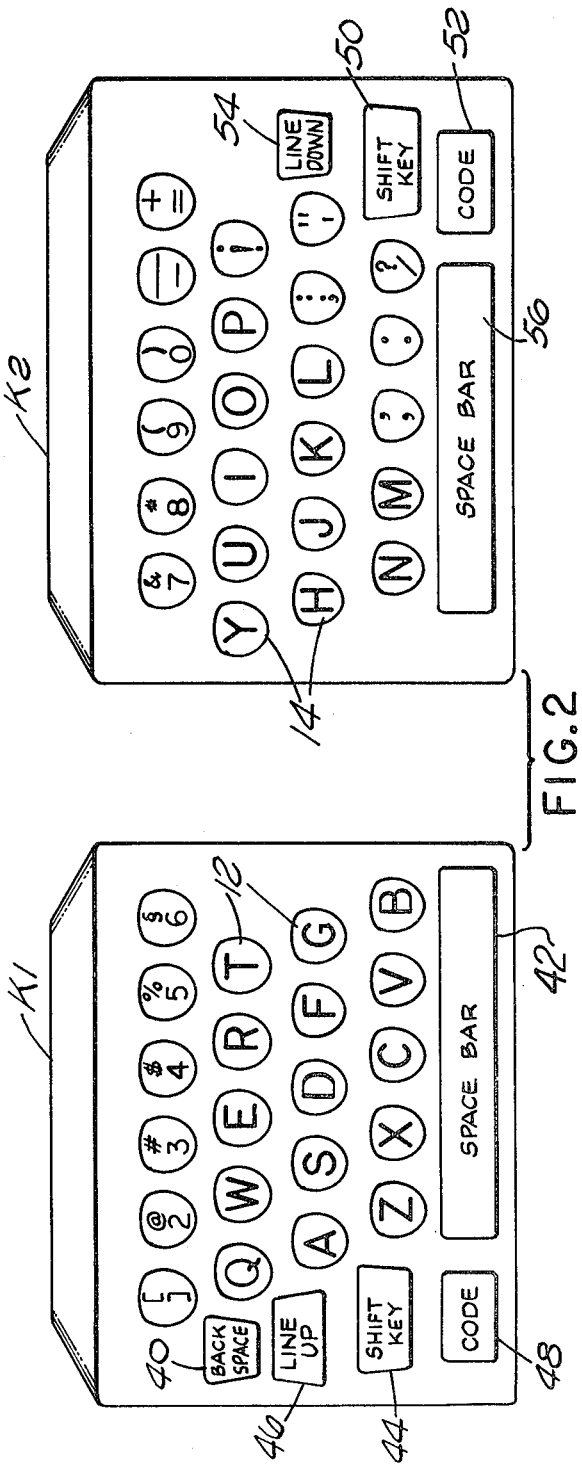
FIG. 2 is a top plan view of a pair of keyboard units as employed in the system of FIG. 1.

Considering the keyboard units K1 and K2 in somewhat greater detail, reference will now be made to FIG. 2 illustrating the two distinctly separate structures. Preliminarily, it is to be understood that each of the represented sets of keys 12 and 14 incorporates an electromechanical apparatus to formulate data signals. Certain of the keys also may be actuated to formulate control-function signals. Of course, such apparatus is well known and widely used in prior-art structures.

The keys 12 (FIG. 2) of the keyboard unit K1 are designated with specific symbols including the numbers two through six and the alphabetic letters: q, w, e, r, t, a, s, d, f, g, z, x, c, v, and b. Such letter symbols coincide with the keys conventionally assigned for operation by the left hand in established typewriter configurations.

The keys 12 also include certain designated operand or control function keys. Specifically, a key 40 commands back space and a bar 42 commands a forward space. A key 44 places the keys 12 and 14 (both keyboard units K1 and K2) in a shift configuration to provide the alternative signal forms from the primary alphabetic and numeric designations in accordance with convention.

A key 46 of the keyboard K1 displaces the operating location of the system. That is, in the same fashion that the back space key 40 and the space bar 42 displace the operating location horizontally, the key 46 (designated "line up") displaces the operating location vertically downward. Generally, the operating location will be manifest on the display apparatus 36 (FIG. 1) by a cursor or other indicator as well known in the prior art. Upward vertical displacement of the cursor is accomplished by a key (discussed below) on the keyboard unit K2.

A key 48 (lower left) on the keyboard unit K1 performs a function that is somewhat related to that of the shift key 44. The key 48 designated "code" alters the sense of certain alphabetic or numeric keys to produce command signals or operands rather than data. Of course, any of a variety of specific arrangements might be implemented; however, in one configuration, upon depression of the code key 48, a key on the keyboard unit K2 (specifically, the key for the letter "m") may be depressed to indicate the end of a paragraph. Of course, other commands may be similarly encoded on various other keys, including commands to manipulate composed data as by data shifts, along with printing operations, display operations, memory operations, and so on.

The shift key 44 and the code key 48 of the keyboard unit K1 have direct equivalents on the keyboard unit K2 in a pair of keys 50 and 52 (lower right). A key 54 (right central) on the keyboard unit K2 is designated "line down" and related in function to the key 46 on the unit K1. As indicated above, while the key 46 moves the cursor down (shifting a current typing line up) the key 54 moves the cursor up (current line down).

The space bar 56 on the keyboard K1 is duplicative of the space bar 42 on the keyboard K2. Thus, somewhat in accord with convention, a space can be accomplished using the thumb of either hand.

In addition to the keys explained above, the keyboard unit K2 incorporates numeric keys, symbolic keys, and alphabetic keys all as designated. Specifically, the numeric keys seven through zero are provided along with the indicated alphabetic keys. The alphabetic keys of the keyboard K2 are for generating signals representative of the characters: y, u, i, o, p, h, j, k, l, n, and m.

Recapitulating to some extent, it may be seen that the keyboard units K1 and K2 jointly afford a complete alphanumeric capability and additionally afford structure for accomplishing instructions and commands as to position the cursor, control memory, activate a display, or activate printing operations. The use of the system incorporating the keyboards K1 and K2 may now best be appreciated by considering some exemplary functions of the system operated by a person in a restricted position using limited hand movement with arms supported on the structures 28 and 30.

An exemplary application of the system might involve a bedridden person who has exceedingly restricted arm motion. To accommodate the system for use by such a person, the display 36 (FIG. 1) would be placed in a convenient line of sight. As for the processor 34 and printer 38, such structures might be placed in any of a variety of convenient locations. Note with regard to the printer 38, that a "Z" paper unit can be employed, capable of extended periods of use to produce multiple pages without direct manual operation.

Continuing with an exemplary operation, a form of bedstand may be placed to extend across the operator's body, incorporating armrest structures 28 and 30. As illustrated, the stand S is affixed to the structures 28 and 30 so that the operator's arms are fully supported on the structures 28 and 30 while positioning the operator's left and right hands at the keyboard units K1 and K2 respectively. With the system so provided, the operator may now proceed to accomplish any of a variety of operations including the generation of letter-perfect typewritten copy. Suppose, for example, that the operator desires to type a business or personal letter.

By observing a screen 58 of the display 36, the operator manipulates the keyboard units K1 and K2 to a beginning location, relating the face of the screen 58 to the desired printed page. Specifically, using the horizontal motion keys 40 and 42, the desired horizontal location is attained, and vertical locationing is accomplished with the keys 46 and 54.

After having attained the desired operating location (to be indicated by a cursor on the screen 58) the operator may type a date, return address, or create other data by actuating the keys 12 and 14 in the usual sequence of manual typing. Continuing in that manner, a one-page document, as in the form of the assumed letter, may be completed.

Certain special commands may be accomplished in the copy as to command underlining, paragraphs, and so on. Such instructions are performed by depressing one of the code keys 48 or 52 and a specific dual-function command key. Also, such command keys are provided to command various operations as to insert characters, delete characters, as well as displace text in the created data. With such flexibility and control, the operator may complete precisely the document as is desired. Of course, dexterity will result in time economy, however, in any event, physical motion may be exceedingly limited and even without skill excellent results are possible.

With the desired page reduced to data as exhibited on the screen 58, the operator may next want to record or print such data. To perform a recording operation, the operator first depresses the code key 52 then actuates either or both of the alphabetic keys "Q" and "W" to select a desired recording location, e.g. track on a floppy disc. With the track selected, the operator depresses the code key 52 along with the alphabetic key "E" to command the recording operation. Note that once recorded, the text may subsequently be retrieved and displayed by depressing the code key 52 with the alphabetic key "R".

To print the composed copy, the operator simply depresses the code key 48 simultaneously with the alphabetic key "P" to command a printing operation. Having performed recording and printing operations, the operator may now wish to clear the display by simply depressing the code key 52 simultaneously with the alphabetic key "C".

In view of the above, it may be seen that the system of the present invention may be effectively embodied to enable the accomplishment of quality documents with exceedingly restricted motion patterns. The system can be similarly adapted to enable operators to play games, operate a computing system, and interface with any of a wide variety of data processing structures. In view of the many possible applications for the system as well as the multitude of terminal apparatus available by current technology, the scope hereof should be recognized as defined by the claims set forth below.

What is claimed is:

1. An electromechanical interactive terminal system comprising:
   a first keyboard means including a first partial set of standard keys for activation by one hand of an operator, said first partial set of standard keys to formulate electrical signals representative of first associated standard symbols;
   a second keyboard means including a second partial set of standard keys complementary to said first set of standard keys, for activation by another hand of said operator, said second partial set of standard keys to formulate electrical signals representative of second associated standard symbols;
   a support stand for holding said first and said second keyboard means at spaced-apart locations; and
   means for processing said electrical signals.

2. A system according to claim 1 wherein said first keyboard means includes the keys of a standard typewriter which are conventionally assigned for operation by the left hand and said second keyboard means includes the keys of a standard typewriter which are conventionally assigned for operation by the right hand.

3. A system according to claim 1 wherein said support stand includes a clamp means, as for affixing said keyboard means in locations contiguous to an operator's hands.

4. A system according to claim 1 wherein said means for processing includes a memory means for providing records of composed data.

5. A system according to claim 1 wherein said means for processing includes a printer means for printing said standard symbols represented by said electrical signals.

6. A system according to claim 2 wherein said means for processing includes a printer means for printing said standard symbols represented by said electrical signals.

7. A system according to claim 6 wherein said support stand includes a clamp means, as for affixing said keyboard means in locations contiguous to an operator's hands.

8. A system according to claim 7 wherein said means for processing includes a memory means for providing records of composed data.

9. A system according to claim 5 wherein said first and second keyboard means include means for simultaneous actuation to control said printer means.

10. A system according to claim 1 wherein said processing means includes a display screen and said keyboard means include means for displacing a cursor on said screen.

11. An electromechanical interactive terminal system comprising:
    a first keyboard means including a first partial set of keys for activation by one hand of an operator, said first partial set of keys to formulate electrical signals representative of first associated symbols;
    a second keyboard means including a second partial set of keys complementary to said first set of keys, for activation by another hand of said operator, said second partial set of keys to formulate electrical signals representative of second associated symbols; and
    means for receiving and processing said electrical signals to accomplish composite data.

* * * * *